United States Patent
Wahlström

(10) Patent No.: US 11,746,684 B2
(45) Date of Patent: Sep. 5, 2023

(54) EXHAUST AFTERTREATMENT ARRANGEMENT FOR CONVERTING NOX EMISSIONS

(71) Applicant: VOLVO TRUCK CORPORATION, Gothenburg (SE)

(72) Inventor: Gert-Ove Wahlström, Askim (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/654,338

(22) Filed: Mar. 10, 2022

(65) Prior Publication Data
US 2022/0307402 A1 Sep. 29, 2022

(30) Foreign Application Priority Data
Mar. 25, 2021 (EP) .................................. 21164781

(51) Int. Cl.
*F01N 3/20* (2006.01)
*F01N 3/28* (2006.01)

(52) U.S. Cl.
CPC ......... *F01N 3/2066* (2013.01); *F01N 3/2892* (2013.01); *F01N 2240/16* (2013.01);
(Continued)

(58) Field of Classification Search
CPC .. F01N 3/2066; F01N 3/2892; F01N 2240/16; F01N 2240/20; F01N 2610/02; F01N 2610/102; F01N 2900/1811
See application file for complete search history.

(56) References Cited

U.S. PATENT DOCUMENTS

| | | | |
|---|---|---|---|
| 8,082,732 B2 * | 12/2011 | Nefischer | B01F 25/25 60/303 |
| 9,617,895 B2 * | 4/2017 | Mueller-Haas | F01N 3/208 |

(Continued)

FOREIGN PATENT DOCUMENTS

| | | |
|---|---|---|
| DE | 102005063081 A1 | 7/2007 |
| DE | 102015201193 B3 | 6/2016 |

(Continued)

OTHER PUBLICATIONS

European Search Report dated Sep. 22, 2021 in corresponding European Patent Application No. 21164780.5, 6 pages.

(Continued)

*Primary Examiner* — Audrey B. Walter
(74) *Attorney, Agent, or Firm* — Venable LLP; Jeffri A. Kaminski

(57) ABSTRACT

An exhaust aftertreatment arrangement for converting NOx emissions. The exhaust aftertreatment arrangement includes a fluid channel for providing a fluid pathway for the exhaust gases, a selective catalyst reduction, SCR, catalyst, arranged in or downstream the fluid channel, an injector configured to inject a liquid reductant for providing ammonia to the SCR catalyst, the injector being arranged upstream of the SCR catalyst, a heating arrangement for heating the injected reductant, the heating arrangement being arranged upstream of the SCR catalyst and comprising an electrical heating element and at least one evaporation member configured to be heated by the heating element. The evaporation member is arranged in the fluid channel such that at least a portion of the injected liquid reductant comes into contact with the evaporation member when injected.

13 Claims, 6 Drawing Sheets

(52) U.S. Cl.
CPC ...... *F01N 2240/20* (2013.01); *F01N 2610/02* (2013.01); *F01N 2610/102* (2013.01); *F01N 2900/1811* (2013.01)

(56) References Cited

U.S. PATENT DOCUMENTS

| | | | |
|---|---|---|---|
| 10,253,670 | B2 | 4/2019 | Werni et al. |
| 10,358,961 | B2 | 7/2019 | Inoue et al. |
| 2011/0000194 | A1 | 1/2011 | Gonze et al. |
| 2011/0047974 | A1* | 3/2011 | Henry .................. F01N 3/2066 60/303 |
| 2011/0131950 | A1 | 6/2011 | Pamin |
| 2013/0118157 | A1* | 5/2013 | Kruse .................. F01N 3/2066 422/168 |
| 2014/0154139 | A1 | 6/2014 | Van Niekerk et al. |
| 2015/0152766 | A1* | 6/2015 | Brunel .................. F01N 3/2013 422/148 |
| 2016/0194991 | A1 | 7/2016 | Clayton, Jr. et al. |
| 2018/0216511 | A1 | 8/2018 | Yamashita |
| 2018/0334940 | A1* | 11/2018 | Calvo .................. F01N 3/2066 |
| 2019/0383189 | A1 | 12/2019 | Dou et al. |
| 2019/0383190 | A1 | 12/2019 | Stock et al. |
| 2020/0291839 | A1 | 9/2020 | Lambert et al. |
| 2021/0003056 | A1 | 1/2021 | Huang et al. |
| 2021/0301700 | A1 | 9/2021 | Brahma |
| 2021/0404362 | A1 | 12/2021 | Salemme |

FOREIGN PATENT DOCUMENTS

| | | | |
|---|---|---|---|
| DE | 102016223578 | A1 | 5/2018 |
| EP | 1484481 | A1 | 12/2004 |
| EP | 3139009 | A1 | 3/2017 |
| EP | 3208436 | A1 | 8/2017 |
| EP | 3757361 | A1 | 12/2020 |
| FR | 3072123 | A1 | 4/2019 |
| JP | 2005155404 | A | 6/2005 |
| JP | 2019094878 | A | 6/2019 |

OTHER PUBLICATIONS

European Search Report dated Sep. 1, 2021 in corresponding European Patent Application No. 21164781.3, 8 pages.
Official Action dated Jul. 8, 2022 in related U.S. Appl. No. 17/654,335, 20 pages.

* cited by examiner

EXHAUST AFTERTREATMENT ARRANGEMENT FOR CONVERTING NOX EMISSIONS

TECHNICAL FIELD

The present invention relates to an exhaust aftertreatment arrangement for converting NOx emissions. The invention further relates to a heating arrangement for an exhaust aftertreatment arrangement, a vehicle comprising an exhaust aftertreatment arrangement or a heating arrangement, and to a method for assembling and/or disassembling a heating arrangement relative a fluid channel of an exhaust aftertreatment arrangement.

BACKGROUND

A vehicle typically comprises an engine for propelling the vehicle. The engine may be powered by various means, such as e.g. by liquid or gaseous fuel in an internal combustion engine, or by electric power in an electric machine. Moreover, hybrid solutions exist in which the vehicle is propelled both by an internal combustion engine and an electric machine.

In case the engine is a combustion engine, such as a diesel engine, it is common to provide the vehicle with an exhaust aftertreatment system, EATS, to handle emissions from the engine. An EATS for a diesel engine typically includes a diesel oxidation catalyst, DOC, a diesel particulate filter, DPF, and a selective catalytic reduction SCR catalyst. A reductant, such as urea or an ammonia comprising substance, is injected upstream of the SCR catalyst to assist in converting nitrogen oxides, also referred to as NOx, with the aid of a catalyst, into diatomic nitrogen, N2, and water, and potentially carbon dioxide CO2 (depending the choice of reductant). The cleaned, or at least emission reduced, exhaust gases then leaves the EATS and the vehicle through the tailpipe of the vehicle. Other types of engines causing similar emissions as the diesel engine may utilize the same, or a similar, EATS.

Government regulations, together with a constant demand for increased fuel economy of the vehicle, implies a need for a more efficient operation of the EATS. For example, the EATS must heat up fast and have a high conversion efficiency also at very low loads when the temperature of the exhaust gases is low. The need of very efficient engines for meeting stringent CO2-requirements also leads to lower temperature of the exhaust gases and higher engine out NOx-levels which requires large amounts of reductant to be injected upstream the SCR catalyst. Furthermore, when using urea as the reductant, the urea require heat to evaporate and hydrolize into ammonia. If the temperature is low, there is a large risk for creating crystallization and deposits that reduce the effect of the EATS.

Electrical heating elements may be used to heat the exhaust gases to counteract the low temperature of the exhaust gases and reduce the associated disadvantages. However, the addition of electrical heating elements to the EATS increase the complexity of the system, and/or add components that risk being subject to failure and in need of maintenance or exchange. Failure of components in the EATS often requires time consuming servicing with costly downtime of the vehicle. Moreover, component failure which leads to component exchange, or even exchange of the complete EATS, is bad for the environment.

Thus, there is a need in the industry for an improved EATS aiming to alleviate the above-mentioned drawbacks.

SUMMARY

It is an object of the present invention to at least partly alleviate the shortcomings discussed above in relation to known exhaust aftertreatment systems, and provide an improved exhaust aftertreatment arrangement.

According to a first aspect of the present invention, an exhaust aftertreatment arrangement for converting NOx emissions is provided. The exhaust aftertreatment arrangement comprises:
  a fluid channel for providing a fluid pathway for the exhaust gases,
  a selective catalyst reduction, SCR, catalyst, arranged in or downstream the fluid channel,
  an injector configured to inject a liquid reductant for providing ammonia to the SCR catalyst, the injector being arranged upstream of the SCR catalyst,
  a heating arrangement for heating the injected reductant, the heating arrangement being arranged upstream of the SCR catalyst and comprising an electrical heating element and at least one evaporation member configured to be heated by the heating element, wherein the heating arrangement is removably arranged relative the fluid channel such that, in an assembled state, the evaporation member is arranged in the fluid channel such that at least a portion of the injected liquid reductant comes into contact with the evaporation member when injected.

Thus, the shortcomings of low temperatures of the exhaust gases is alleviated by means of the electrical heating element and the evaporation member which improves reductant evaporation, while the heating arrangement is yet easily removable from the fluid channel for accessing the components therein. Hereby, at least the electrical heating element and the evaporation member are made accessible for e.g. maintenance or exchange. That is, the heating arrangement is removable from the fluid channel and the components therein may be made accessible for e.g. maintenance or exchange. The invention provides a combination of a simple configuration enabling easy access to the components of the heating arrangement while improving the performance of the exhaust aftertreatment arrangement. Thus, an improved exhaust aftertreatment arrangement is provided with a highly efficient removal of emission of the exhaust gases owing at least to the heating of the exhaust gases by the electrical heating element and the improved evaporation by the evaporation member, while reducing the additional complexity of the heating arrangement as it is removably arranged relative the fluid channel.

As the heating arrangement is removably arranged relative the fluid channel, it is arrangeable in an assembled state in which the heating arrangement is arranged in the fluid channel, or forms an integrated part of the fluid channel, or is in direct fluid communication with the fluid channel, and is arrangeable in a disassembled state in which the heating arrangement is removed, or detached, from the fluid channel. During use of the exhaust aftertreatment arrangement, i.e. when using the exhaust aftertreatment arrangement for converting NOx emissions, the heating arrangement is arranged in the assembled state. The disassembled state may e.g. be used during maintenance of the heating arrangement or any components therein.

According to at least one example embodiment, the evaporation member is arranged in the fluid channel such that, in use, at least a portion of the injected liquid reductant comes into contact with the evaporation member. Stated differently, the evaporation member is arranged in the fluid channel such that, in use, the evaporation member receives at least a portion of the injected liquid reductant. In other words, the evaporation member is, in the assembled state, arranged to receive any injected liquid reductant. According to at least one example embodiment, the injector and the heating arrangement are arranged such that, in use, at least a portion of the injected liquid reductant comes into contact with the evaporation member. It should be noted that the evaporation member improves reductant evaporation and thereby at least partly reduces the risk of reductant crystallization and internal deposits. Moreover, the reductant may be hydrolyzed into ammonia. It should be noted that throughout the application text the reductant injected by the injector is a liquid reductant, even if it is not explicitly stated so. At least a part of the liquid reductant may evaporate owing to the heat from the heated exhaust gases, and at least a part of the liquid reductant may reach the evaporation member as a liquid.

According to at least one example embodiment, the evaporation member is removably arranged relative the heating arrangement.

Thus, upon removal from the heating arrangement from the fluid channel, the evaporation member may be removed from the heating arrangement and subject to e.g. maintenance or exchange. Correspondingly, the electrical heating element may be removably arranged relative the heating arrangement and/or the evaporation member. Thus, the electrical heating element may be separated and subject to e.g. maintenance or exchange.

According to at least one example embodiment, the SCR catalyst is arranged in the fluid channel, such as e.g. downstream in the fluid channel as compared to the injector. Alternatively, the SCR catalyst is arranged downstream the fluid channel. For example, the fluid channel may end, or exit, into the SCR catalyst.

According to at least one example embodiment, the electrical heating element of the heating arrangement is, in the assembled state, arranged upstream of the injector. Thus, exhaust gases heated by the electrical heating element may be heated prior to encountering the injected reductant. According to at least one example embodiment, at least a portion of the evaporation member is, in the assembled state of the heating arrangement, arranged parallel to the injector. Hereby, any injected reductant is easily brought into contact with the evaporation member. According to at least one example embodiment, in the assembled state, the injector is arranged between the heating arrangement and the SCR catalyst. According to at least one example embodiment, the injector is arranged to inject the reductant into the fluid channel. According to at least one example embodiment, in the assembled state, the injector is arranged in the fluid channel to face the evaporation member. Thus, the injector may be arranged at some distance from the evaporation member, but still being able to inject reductant that is brought into contact with the evaporation member.

According to at least one example embodiment, the heating arrangement is configured to heat the injected reductant directly via the evaporation member, and indirectly via heating the exhaust gases passing the electrical heating element. Thus, the heated exhaust gases heat the injected reductant subsequently to passing the electrical heating element.

According to at least one example embodiment, the electrical heating element is configured to heat the evaporation member by direct contact. Thus, heat may be conducted to the evaporation member from the electrical heating element to the evaporation member. For example, the evaporation member comprises a structure which is integrated into the electrical heating element. According to at least one alternative example embodiment, the electrical heating element is configured to contactless heat the evaporation member. Thus, heat may be convectively transferred from the electrical heating element, via the exhaust gases or air, to the evaporation member.

According to at least one example embodiment, the fluid channel comprises a first channel flange arranged upstream of the injector, and the heating arrangement comprises a first heating arrangement flange, such that, in the assembled state, the first channel flange is circumferentially connected to the first heating arrangement flange, and wherein the heating arrangement is removably arranged relative the fluid channel at least by that the first channel flange is removably connected to the first heating arrangement flange.

Hereby, a simple yet effective means for removably arranging the heating arrangement relative the fluid channel is provided. For example, the first channel flange may be a flange at an end portion of the fluid channel, and the heating arrangement may thus be removably arranged, or removably connected, to such end portion of the fluid channel by means of the first channel flange and the first heating arrangement flange. Thus, during use, exhaust gases are entering the fluid channel via the heating arrangement. Stated differently, the first channel flange is circumferentially connectable to the first heating arrangement flange, or the first channel flange is configured to be circumferentially connected to the first heating arrangement flange.

According to at least one example embodiment, the fluid channel further comprises a second channel flange arranged upstream of the first channel flange, wherein the heating arrangement further comprises a second heating arrangement flange arranged opposite to the first heating arrangement flange, such that, in the assembled state, the second channel flange is circumferentially connected to the second heating arrangement flange, and wherein the heating arrangement is removably arranged relative the fluid channel by that the first channel flange is removably connected to the first heating arrangement flange and by that the second channel flange is removably connected to the second heating arrangement flange.

Hereby, yet another simple and effective means for removably arranging the heating arrangement relative the fluid channel is provided. Thus, the heating arrangement may form a part of the fluid pathway when connected to the fluid channel. In other words, the heating arrangement is removably arranged in the fluid channel. The fluid channel may thus comprise a first channel portion downstream of the first channel flange, and a second channel portion upstream of the second channel flange. Hereby, the heating arrangement is removably arranged in the fluid channel to fluidly connect the first channel portion with the second channel portion. Thus, when the heating arrangement is removed from the fluid channel, the fluid channel is divided into the two separate channel portions, i.e. the first and second channel portions. The second channel portion may be referred to as an upstream channel portion extending upstream from the second channel flange, and the first channel portion may be referred to as a downstream channel portion extending downstream from the first channel flange. Thus, during use, exhaust gases are entering the upstream channel portion and are passed to the downstream channel portion via the heating arrangement. Stated differently, the second channel flange is circumferentially connectable to the second heating arrangement flange, or the second channel flange is configured to be circumferentially connected to the second heating arrangement flange. The downstream channel portion may comprise a flexible pipe. The upstream channel portion may be fluidly connected to, or be comprised in, an outlet part of a turbo charger.

According to at least one example embodiment, the injector is arranged just downstream the first channel flange, e.g. within 1-20 cm, of the first channel flange. The distance being the flow path distance between the injector and the first channel flange.

According to at least one example embodiment, the evaporation member is, in the assembled state, arranged to extend from the heating arrangement into the fluid channel across the first channel flange.

Hereby, the evaporation member is, in the assembled state, arranged in the fluid channel to receive injected liquid reductant so that the liquid reductant may be heated and evaporated. For example, in the assembled state, the evaporation member may extend from the first heating arrangement flange, or extend across the first heating arrangement flange, and further across the first channel flange. Stated differently, the evaporation member may be arranged to extend out from, or across, the first heating arrangement flange.

According to at least one example embodiment, the heating arrangement comprises a heating channel extending up to the first heating arrangement flange, wherein the first electrical heating element is arranged in the heating channel, or wherein the electrical heating element is arranged to extend from the heating channel or out from the first heating arrangement flange.

Thus, in the assembled state, the heating channel extends from the upstream channel portion to the downstream channel portion, or simply receives the exhaust gases and guides them further to the fluid channel. By arranging the electrical heating element in the heating channel, such that e.g. the whole electrical heating element is arranged in the heating channel, the risk of having injected reductant reaching the electrical heating element is reduced, as the electrical heating element is arranged distant from the injector and distant to the position of injection of reductant in the fluid channel. By arranging the electrical heating element to extend from the heating channel across the first heating arrangement flange, or from the first heating arrangement flange, the electrical heating element may be brought closer to the position of injection of reductant, and the applied heat may be better utilized. However, as it is desirable to avoid direct contact of the liquid reductant and the electrical heating element, for embodiments in which the electrical heating element extend from the heating channel across the first heating arrangement flange, the electrical heating element is preferably covered, e.g. by the evaporation element, and/or the injector is directed such that the reductant is injected away from the electrical heating element.

According to at least one example embodiment, in the assembled state, the electrical heating element extends from the heating channel across the first heating arrangement flange, and across the first channel flange, and into the fluid channel.

According to at least one example embodiment, the heating channel extends from the second heating arrangement flange to the first heating arrangement flange. According to at least one example embodiment, the heating channel forms a portion of the fluid channel. According to at least one example embodiment, the heating channel fluidly connects the upstream channel portion with the downstream channel portion.

According to at least one example embodiment, the heating channel comprises a channel bend.

Hereby, exhaust gases flowing through the heating channel may be subject to increased mixing, and the heating of the exhaust gases may be improved. Moreover, by providing the electrical heating element within the heating channel, wherein the heating channel comprises a channel bed, the electrical heating element may be better protected from injected reductant. Moreover, the heating arrangement may connect the upstream channel portion with the downstream channel portion while the channel bend provides a bend, or curve, of the fluid channel.

According to at least one example embodiment, the evaporation member comprises a plate having a reductant impacting surface arranged to face the injector.

That is, in the assembled state, the plate may be arranged such that a surface of the plate, i.e. the reductant impacting surface, is facing the injector, or is facing the orifice of the injector configured to inject the reductant. Hereby, injected reductant may be brought into contact with the evaporation member in an easy yet effective manner. It should be understood that the plate is an evaporation plate and is thus heated by the electrical heating element.

According to at least one example embodiment, the plate is a first plate having a first longitudinal extension, and the evaporation member further comprises a second plate having a second longitudinal extension different to the first longitudinal extension.

Typically, the second plate comprises a reductant impacting surface arranged to at least partly face the injector. Thus, the first and second plates may be arranged in a step-wise manner, and may together efficiently evaporate the injected reductant. For example, the first plate may be arranged closer to the injector as compared to the arrangement of the second plate to the injector. Hereby, a large portion of injected liquid reductant may be brought into contact with the relatively close first plate. Any liquid reductant that slips by the first plate may then come into contact with the second plate being arranged relatively further away from the injector. Hereby, the total reductant impacting surface of the evaporation member may be increased.

The longitudinal extension is typically an extension in the longitudinal direction of the heating arrangement. During use, the exhaust gases typically flows in the longitudinal direction of the heating arrangement.

According to at least one example embodiment, the evaporation member is defined as a plate, or is defined as one or more plates. Thus, the evaporation member may constitute one plate, or constitute a plurality of plates, the plurality being more than one.

According to at least one example embodiment, the evaporation member is configured to induce a swirling motion of the exhaust gases.

Hereby, exhaust gases flowing through the evaporation member may be subject to increased mixing, and the heating of the exhaust gases may be improved. For example, the evaporation member comprises an angled structure configured to create a swirling motion of the exhaust gases. The angled structure may e.g. be comprised in the first plate and/or second plate. For example, the first plate and/or the second plate may be arranged to at least partly twist in the longitudinal direction.

According to at least one example embodiment, the heating arrangement is arranged such that, in use, the injected liquid reductant is prevented from being brought into contact with the electrical heating element.

For example, the electrical heating element is arranged upstream of the injector at a distance not reachable for any injected liquid reductant. According to another example, the electrical heating element is arranged behind a bend (as e.g. described above in the heating channel comprising a channel bend). According to at least one example embodiment, the evaporation member is covering, or is protecting, the electrical heating element. Thus, the evaporation member, e.g. the first plate and/or the second plate, may act as a shield for the electrical heating element in such a way that any liquid reductant impacts the shield instead of reaching the electrical heating element.

According to at least one example embodiment, the fluid channel is a first fluid channel, the SCR catalyst is a first SCR catalyst, the injector is a first injector, and the heating arrangement is a first heating arrangement, the exhaust aftertreatment arrangement further comprising:

a second SCR catalyst arranged downstream of the first SCR catalyst, a second injector configured to inject a liquid reductant for providing ammonia to the second SCR catalyst, the injector being arranged in the second fluid channel and upstream of the second SCR catalyst, a second heating arrangement for heating the injected reductant of the second injector, the second heating arrangement being arranged upstream of the second SCR catalyst and comprising a second electrical heating element and at least one second evaporation member configured to be heated by the second heating element, wherein the second heating arrangement is removably arranged relative the second fluid channel such that, in the assembled state, the second evaporation member is arranged in the fluid channel such that at least a portion of the injected liquid reductant comes into contact with the evaporation member when injected.

The embodiments mentioned in relation to the first heating arrangement, first fluid channel, first injector and first SCR catalyst, are equally applicable to the second heating arrangement, second fluid channel, second injector and second SCR catalyst, and are not repeated here again.

According to a second aspect of the invention, a heating arrangement for an exhaust aftertreatment arrangement for converting NOx emissions, is provided. The exhaust aftertreatment arrangement comprises a fluid channel for providing a fluid pathway for the exhaust gases, a selective catalyst reduction, SCR, catalyst, arranged in or downstream the fluid channel, and an injector configured to inject a liquid reductant for providing ammonia to the SCR catalyst, the injector being arranged upstream of the SCR catalyst. The heating arrangement comprises an electrical heating element and at least one evaporation member configured to be heated by the heating element, wherein the heating arrangement is removably connectable to the fluid channel such that, in the assembled state, the evaporation member is arranged in the fluid channel such that at least a portion of the injected liquid reductant comes into contact with the evaporation member when it is injected.

Effects and features of the second aspect of the invention are largely analogous to those described above in connection with the first aspect of the invention, at least in relation to the heating arrangement. Embodiments mentioned in relation to the first aspect of the invention, at least in relation to the heating arrangement, are largely compatible with the second aspect of the invention. Thus, the electrical heating arrangement is able to be removably arranged relative the fluid channel upstream of the SCR catalyst, and at least partly upstream of the injector.

According to at least one example embodiment, the heating arrangement comprises a first heating arrangement flange and a second heating arrangement flange arranged opposite to the first heating arrangement flange, the first heating arrangement flange is circumferentially connectable to a first channel flange of the fluid channel, and the second heating arrangement flange is circumferentially connectable to a second channel flange of the fluid channel.

The first and second fluid channel flanges of the fluid channel has been described with reference to the first aspect of the invention. Hereby, the heating arrangement may be removably arranged to the fluid channel. Thus, the heating arrangement is arrangeable in an assembled state in relation to the fluid channel in such a way that the first heating arrangement flange is circumferentially connected to the first channel flange of the fluid channel, and that the second heating arrangement flange is circumferentially connected to the second channel flange of the fluid channel. Moreover, the first heating arrangement flange is removably connectable to the first channel flange of the fluid channel, and the second heating arrangement flange is removably connectable to the second channel flange of the fluid channel, such that the heating arrangement is arrangeable in a disassembled state relative the fluid channel.

According to a third aspect of the invention, a heating arrangement for an exhaust aftertreatment arrangement for converting NOx emissions, is provided. The heating arrangement comprises an electrical heating element and at least one evaporation member configured to be heated by the heating element, wherein the heating arrangement is configured to be removably connectable to a fluid channel of the exhaust aftertreatment arrangement.

According to at least one example embodiment, the heating arrangement comprises a first heating arrangement flange.

According to at least one example embodiment, the heating arrangement further comprises a second heating arrangement flange arranged opposite to the first heating arrangement flange.

According to at least one example embodiment, the heating arrangement further comprises a heating channel extending between the first heating arrangement flange and the second heating arrangement flange, wherein the electrical heating element is arranged in the heating channel, or wherein the electrical heating element is arranged to extend from the heating channel or out from the first heating arrangement flange.

According to at least one example embodiment, the evaporation member extends out from the first heating arrangement flange, or extend from the heating channel across the first heating arrangement flange. Stated differently, the evaporation member may be arranged to extend out from, or across, the first heating arrangement flange.

According to at least one example embodiment, the evaporation member comprises a plate having a planar surface. For example, the plate may extend out from the first heating arrangement flange, or extend from the heating channel across the first heating arrangement flange.

According to at least one example embodiment, the plate is a first plate having a first longitudinal extension, and the evaporation member further comprises a second plate having a second longitudinal extension different to the first longitudinal extension. Typically, the second plate comprises a planar surface. The first longitudinal extension may be smaller than the second longitudinal extension. Thus, the first and second plates may be arranged in a step-wise manner. The longitudinal extension is typically an extension in the longitudinal direction of the heating arrangement, or heating channel, which is traverse the radial direction of the heating arrangement, or heating channel. Thus, the first and/or second plate, and their respective planar surface may largely extend in the longitudinal direction.

According to at least one example embodiment, the evaporation member is removably arranged relative the electrical heating element.

According to a fourth aspect of the invention, a vehicle comprising an exhaust aftertreatment arrangement according the first aspect of the invention, or a heating arrangement according to the second or third aspects of the invention, is provided.

Effects and features of the fourth aspect of the invention are largely analogous to those described above in connection with the first and second aspects of the invention. Embodiments mentioned in relation to the first aspect of the invention are largely compatible with the fourth aspect of the invention.

According to a fifth aspect of the invention, a method for assembling and/or disassembling a heating arrangement relative a fluid channel of an exhaust aftertreatment arrangement for converting NOx emissions, is provided. The exhaust aftertreatment arrangement comprises a fluid channel for providing a fluid pathway for the exhaust gases, a selective catalyst reduction, SCR, catalyst, arranged in or downstream the fluid channel, and an injector configured to inject a liquid reductant for providing ammonia to the SCR catalyst, the injector being arranged upstream of the SCR catalyst, wherein the heating arrangement comprises an electrical heating element and at least one evaporation member configured to be heated by the heating element, the heating arrangement being removably connectable to the fluid channel. The method comprises:

assembling the heating arrangement relative the fluid channel such that the heating arrangement is arranged upstream of the SCR catalyst and the evaporation member is arranged in the fluid channel such that at least a portion of the injected liquid reductant comes into contact with the evaporation member when injected, and/or disassembling the heating arrangement from the fluid channel.

Hereby, the heating arrangement may be easily connected to, and/or removed from, the fluid channel. Thus, the heating arrangement may be assembled relative the fluid channel and used for alleviating the shortcomings of low temperatures of the exhaust gases by means of the electrical heating element, and the evaporation member improving reductant evaporation. Moreover, the heating arrangement may be easily disassembled for accessing the components therein. Hereby, at least the electrical heating element and the evaporation member are made accessible for e.g. maintenance or exchange. That is, the heating arrangement may be removed from the fluid channel and the components therein may be made accessible for e.g. maintenance or exchange.

The invention provides a combination of a simple configuration enabling easy access to the components of the heating arrangement after dissembling the heating arrangement, while improving the performance of the exhaust aftertreatment arrangement after assembling the heating arrangement. Thus, an improved exhaust aftertreatment arrangement is provided with a highly efficient removal of emission of the exhaust gases owing at least to the heating of the exhaust gases by the electrical heating element and the improved evaporation by the evaporation member, while reducing the additional complexity of the heating arrangement as it is removably arranged relative the fluid channel, and may thus be subject to assembling and disassembling.

Effects and features of the fifth aspect of the invention are largely analogous to those described above in connection with the first aspect of the invention. Embodiments mentioned in relation to the first aspect of the invention, at least in relation to the exhaust aftertreatment arrangement, are largely compatible with the fifth aspect of the invention.

According to at least one example embodiment, the method is performed on an exhaust aftertreatment arrangement in accordance with the first aspect of the invention.

According to at least one example embodiment, the fluid channel comprises a first channel flange arranged upstream of the injector, and the heating arrangement comprises a first heating arrangement flange, wherein the step of assembling the heating arrangement relative the fluid channel comprises circumferentially connecting the first channel flange to the first heating arrangement flange, and/or wherein the step of disassembling comprises disconnecting the first channel flange from the first heating arrangement flange.

Hereby, a simple yet effective means for assembling and disassembling the heating arrangement relative the fluid channel is provided. For example, the first channel flange may be a flange at an end portion of the fluid channel, and the heating arrangement may thus be assembled, or be removably arranged, or removably connected, to such end portion of the fluid channel by means of the first channel flange and the first heating arrangement flange. Thus, during use, exhaust gases are entering the fluid channel via the heating arrangement.

According to at least one example embodiment, the fluid channel further comprises a second channel flange arranged upstream of the first channel flange, and wherein the heating arrangement further comprises a second heating arrangement flange arranged opposite to the first heating arrangement flange, wherein the step of assembling the heating arrangement relative the fluid channel comprises circumferentially connecting the first channel flange to the first heating arrangement flange and circumferentially connecting the second channel flange to the second heating arrangement flange, and/or wherein the step of disassembling comprises disconnecting the first channel flange from the first heating arrangement flange and disconnecting the second channel flange from the second heating arrangement flange.

Hereby, yet another simple and effective means for assembling and disassembling the heating arrangement relative the fluid channel is provided. Thus, the heating arrangement may, when assembled, form a part of the fluid pathway when connected to the fluid channel. In other words, the heating arrangement is assembled to, or is removably arranged in, the fluid channel. The fluid channel may thus comprise a first channel portion downstream of the first channel flange, and a second channel portion upstream of the second channel flange. Hereby, the heating arrangement is assembled to, or removably arranged in, the fluid channel to fluidly connected the first channel portion with the second channel portion. Thus, when the heating arrangement is disassembled, i.e. removed from the fluid channel, the fluid channel is divided into the two separate channel portions, i.e. the first and second channel portions.

According to at least one example embodiment, the step of assembling comprises arranging the evaporation member to extend from the heating arrangement into the fluid channel across the first channel flange.

According to at least one example embodiment, the exhaust aftertreatment arrangement further comprises an emission reducing module being a diesel particulate filter, DPF, i.e. being configured to remove particles, such as diesel particulate matter or soot, from the exhaust gases and/or a diesel oxidation catalyst, DOC arranged and configured to convert carbon monoxide and hydrocarbons into carbon dioxide. Thus, according to at least one example embodiment, the emission reducing module is a combined DPF/DOC, for example in which the DOC is arranged upstream of the DPF. According to at least one example embodiment, the emission reducing module is a DPF. According to at least one example embodiment, the emission reducing module is a DOC. The emission reducing module may e.g. be arranged upstream of the heating arrangement.

It should be understood that the electrical heating element is a heating element which is configured to be heated by means of electricity. According to at least one example embodiment, the electrical heating element comprises a lattice or a grating, or a coil or a plate, configured to be heated by electricity led through the lattice, grating, coil, or plate. The electrical heating element may be of another shape, e.g. in the shape of a flat or curved heating lamella, or comprise a heating element of a different type, e.g. a resistance foam. According to at least one example embodiment, the electrical heating element is a Positive Temperature Coefficient, PTC, based element. According to at least one example embodiment, the electrical heating element is based on induction heating and may be referred to as an induction heating element.

According to at least one example embodiment, the reductant is at least one of the following: anhydrous ammonia, aqueous ammonia, urea, aqueous urea and a diesel exhaust fluid. According to at least one example embodiment, the reductant is urea or liquid urea. The electrical heating element may thus, via the heated exhaust gases, and the evaporation member, provide the reductant with the required heat to evaporate and possibly hydrolize the reductant into ammonia. Depending on the operating power of the electrical heating element, the heated exhaust gases may additionally heat up the SCR catalyst.

According to at least one example embodiment, the electrical heating element is configured to keep the temperature downstream of the electrical heating element and upstream of the SCR catalyst above 180° C. Hereby, fouling caused by the injected reductant can be reduced or even omitted. For example, the electrical heating element is configured to keep the temperature of the exhaust gases flowing in the fluid pathway downstream of the electrical heating element and upstream of the SCR catalyst above 180° C., the temperature being e.g. measured as a mean temperature over a certain distance. The electrical heating element may be configured to keep said temperature between 180° C. and 300° C. Additionally, or alternatively, the electrical heating element is configured to keep the temperature in the SCR catalyst between 180° C. and 300° C.

According to at least one example embodiment, the electrical heating element is controlled to initiate heating of the exhaust gases in response to a measured temperature upstream of the electrical heating element of below 180° C. The electrical heating element may be further controlled to terminate heating of the exhaust gases in response to a measured temperature upstream of the electrical heating element of above 200° C., or in response to a measured temperature downstream of the electrical heating element (and e.g. upstream of the SCR catalyst), of above 300° C. According to at least one example embodiment, the electrical heating element is controlled to initiate heating of the exhaust gases in response to a measured temperature of the SCR catalyst below 200° C., or below 180° C.

According to at least one example embodiment, the electrical heating element is configured to adapt the temperature downstream of the electrical heating element and upstream of the SCR catalyst at least based on the temperature of the injected reductant. Hereby, the temperature of the reductant can be included in the controlling of the electrical heating element.

According to at least one example embodiment, the operating power of the electrical heating element is between 300 W and 15000 W, or between 1000 W and 15000 W. According to at least one example embodiment, the operating voltage of the electrical heating element is 12V, 24V or 48V.

According to at least one example embodiment, the exhaust aftertreatment arrangement comprises a controller configured to control the introduction of reductant into the fluid pathway of the exhaust gases as a function of various exhaust gas parameters, such as NOx, temperature and pressure, for the purpose of controlling NOx concentration in exhaust gases. The exhaust gas parameters may be measured by various sensors at various locations in the exhaust aftertreatment arrangement. For example, NOx sensors may be located at, or proximate, the inlet and outlet of the exhaust aftertreatment arrangement. Temperature sensors, and/or pressure sensors, may be located before and after the electrical heating element, or the SCR catalyst.

The SCR catalyst is typically configured to convert nitrogen oxides, NOx, with the aid of a catalyst into diatomic nitrogen, N2, and water and/or carbon dioxide, CO2. During use, the injected reductant (or the resulting ammonia) is reacted onto the catalyst.

The order of the method steps described in the fifth aspect of the invention is not constrained to that described in the present disclosure. One or several of the steps could switch places, or occur in a different order, unless explicitly stated so without departing from the scope of the invention. However, according to at least one example embodiment, the method steps are performed in the order described in the fifth aspect of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
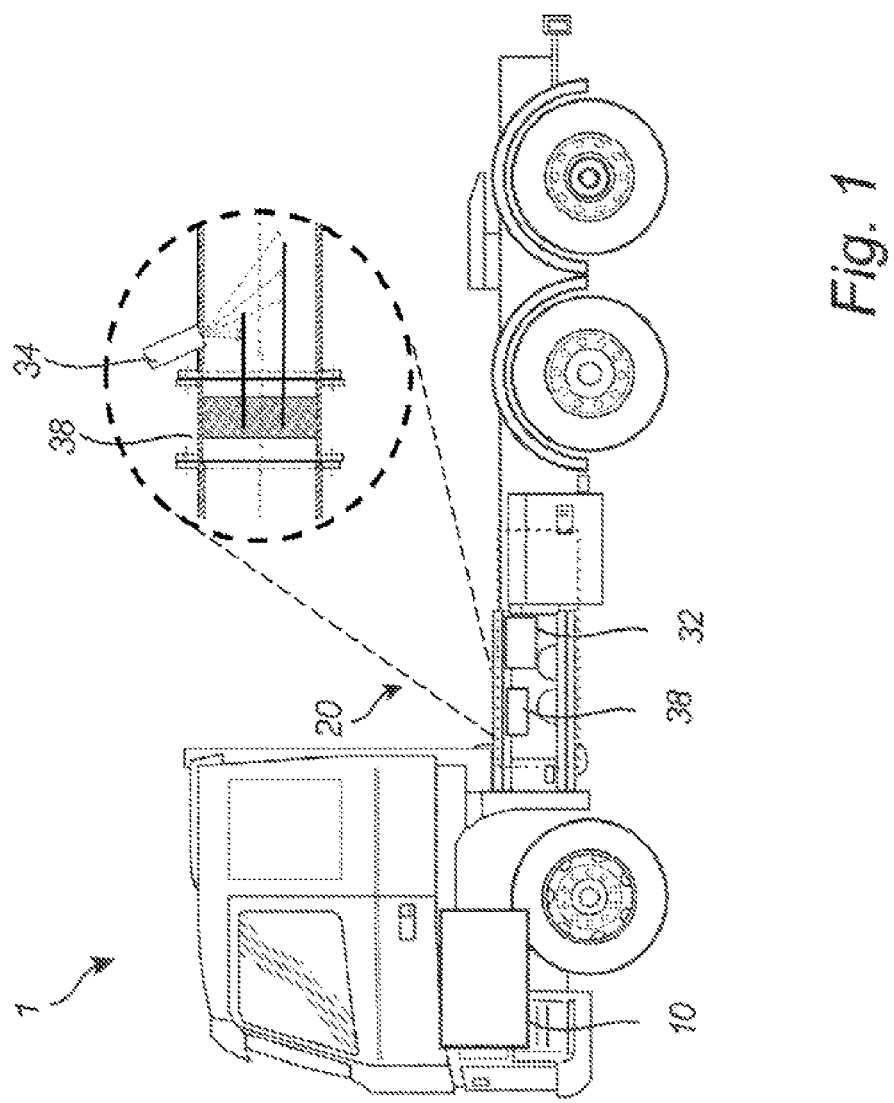
FIG. 1 is a schematic side view of a vehicle comprising an exhaust aftertreatment arrangement in accordance with an example embodiment of the invention.

With reference to FIG. 1 a vehicle 1, here embodied as a heavy duty truck 1, is shown for which an exhaust aftertreatment arrangement 20 of a kind disclosed in the present invention, and a heating arrangement 38 of a kind disclosed in the present invention, are advantageous. However, the exhaust aftertreatment system 20, and/or the heating arrangement 38, may as well be implemented in other types of vehicles, such as in busses, light-weight trucks, passenger cars, marine applications etc. The vehicle 1 of FIG. 1 comprises an engine 10, being a diesel engine 10, but the vehicle 1 may according to at least one example embodiment be a hybrid vehicle further comprising an electric machine (not shown). The diesel engine 10 is powered by diesel fuel, typically comprised in a fuel tank, and any electric machine is typically powered by electricity supplied from at least one energy storage or transformation device, e.g. a battery or a fuel cell.

In FIG. 1, the vehicle 1 further comprises an exhaust aftertreatment arrangement for cleaning exhaust gases from at least the diesel engine 10. The exhaust aftertreatment arrangement 20 comprises at least an SCR catalyst 32, an injector 34 configured to inject a liquid reductant for providing ammonia to the SCR catalyst 32, the injector 34 being arranged upstream of the SCR catalyst 32, and a heating arrangement 38 for heating the injected liquid reductant, as best shown in the enlargement of FIG. 1. The SCR catalyst 32 is arranged and configured to convert nitrogen oxides, also referred to as NOx, with the aid of a catalyst, into diatomic nitrogen, N2, and water, and/or carbon dioxide, CO2. The reductant, typically anhydrous ammonia, aqueous ammonia, urea, aqueous urea or a diesel exhaust fluid solution is added to engine exhaust gases by the injector 34 and is absorbed onto the catalyst in the SCR catalyst 32.

Figure 2:
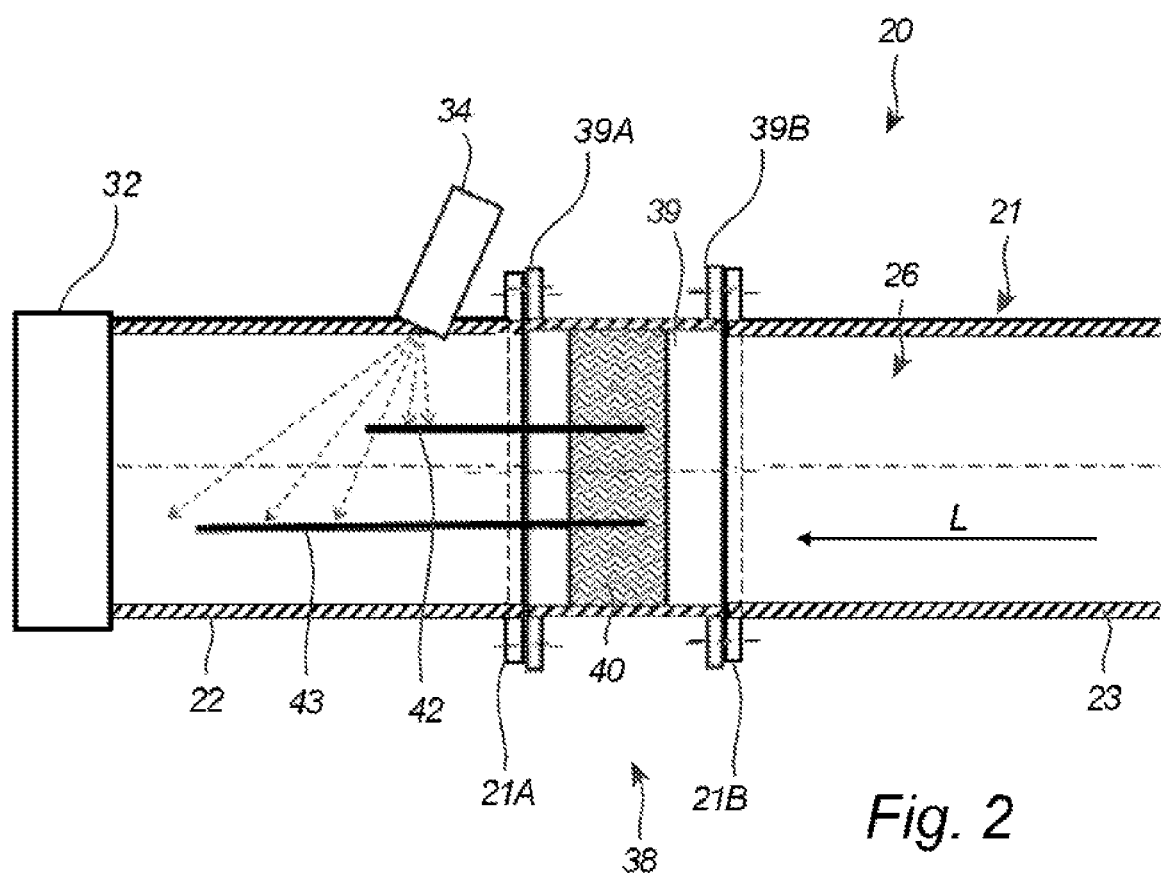
FIG. 2 is a schematic cross sectional view of an exhaust aftertreatment arrangement in accordance with an example embodiment of the invention.

In FIG. 2, the exhaust aftertreatment arrangement 20 of FIG. 1 is shown in greater detail. The exhaust aftertreatment arrangement 20 comprises a fluid channel 21 for providing a fluid pathway 26 for the exhaust gases. The exhaust aftertreatment arrangement 20 further comprises a selective catalyst reduction, SCR, catalyst 32, arranged downstream the fluid channel 21, in FIG. 2 exemplified as the fluid channel 21 ends into the SCR catalyst 32. Moreover, in order provide ammonia to the SCR catalyst 32, the exhaust aftertreatment arrangement 20 comprises an injector 34 arranged upstream of the SCR catalyst 32 and being configured to inject a liquid reductant for providing ammonia to the SCR catalyst 32, as previously described. The reductant being for example urea. The exhaust aftertreatment arrangement 20 further comprises a heating arrangement 38 arranged upstream the SCR catalyst 32, and being configured to heat the injected liquid reductant. The heating arrangement 38 comprises an electrical heating element 40, here embodied as lattice or grating 40 through which the exhaust gases may be passed and heated, and two evaporation members 42, 43 in the form of a first plate 42 and a second plate 43, the first and second plates 43, 43 being planar plates 42, 43 and configured to be heated by the electrical heating element 40. In FIG. 2, the first and second plates 42, 43 are at least partly arranged in direct contact with the heating element 40, and may thereby be conductively heated by the electrical heating element 40.

As seen in FIG. 2, the first and second plates 42, 43 are arranged in the fluid channel 21 such that at least a portion of the injected liquid reductant comes into contact with the first and second plates 42, 43 when injected, indicated by the dashed arrows. In other words, each one of the first and second plates 42, 43 comprises a reductant impacting surface arranged to face the injector 34, or at least face the orifice of the injector 43 through which the reductant is injected. As the reductant comes into contact with the first and second plates 42, 43, the reductant is heated and evaporated and further transported downstream with the exhaust gases to the SCR catalyst 32.

As seen in FIG. 2, the first plate 42 has a first longitudinal extension extending in the longitudinal direction L of the heating arrangement 38, and the second plate 43 has a second longitudinal extension extending in the longitudinal direction L of the heating arrangement 38, the second longitudinal extension being different to the first longitudinal extension. In other words, the first plate 42 is shorter compared to the second plate 43. The longitudinal direction L of the heating arrangement 38 is, in the assembled state, the same as the longitudinal direction of the fluid channel 21. The longitudinal direction L extends in the main fluid flow direction and is traverse the radial direction of the heating arrangement 38.

Moreover, in FIG. 2, the first and second plates 42, 43 are arranged in a step-wise manner, as the first plate 42 is arranged closer to the injector 34 as compared to the distance of the second plate 43 to the injector 34. Hereby, a large portion of injected liquid reductant may be brought into contact with the relatively close first plate 42, and any liquid reductant that slips by the first plate 42 may then come into contact with the second plate 43, the second plate 43 being arranged relatively further away from the injector 34. Hereby, the total reductant impacting surface of the first and second plates 42, 43 is increased.

It should be noted that only one of the first and second plates 42, 43 may be used as evaporation member, or that more than two plates are used. Moreover, the evaporation member needs not to be shaped as a planar plate, but may have another shape and size, as will e.g. be described with reference to FIG. 6.

The heating arrangement 38 in FIG. 2 is removably arranged relative the fluid channel 21. Thus, the heating arrangement 38 may be removed from the fluid channel 21 and be subject to e.g. maintenance or component exchange. Owing to this, the fluid channel 21 comprises a first channel flange 21A arranged upstream of the injector 34, and a second channel flange 21B arranged upstream of the first channel flange 21A. Hereby, the fluid channel 21 is dividable into two channel portions, a first channel portion 22, or a downstream channel portion 22, and a second channel portion 23, or upstream channel portion 23. The downstream channel portion 22 is extending downstream from the first channel flange 21A and in FIG. 2, up to the SCR catalyst 32, and the upstream channel portion 23 is extending upstream from the second channel flange 21B.

Figure 3A:
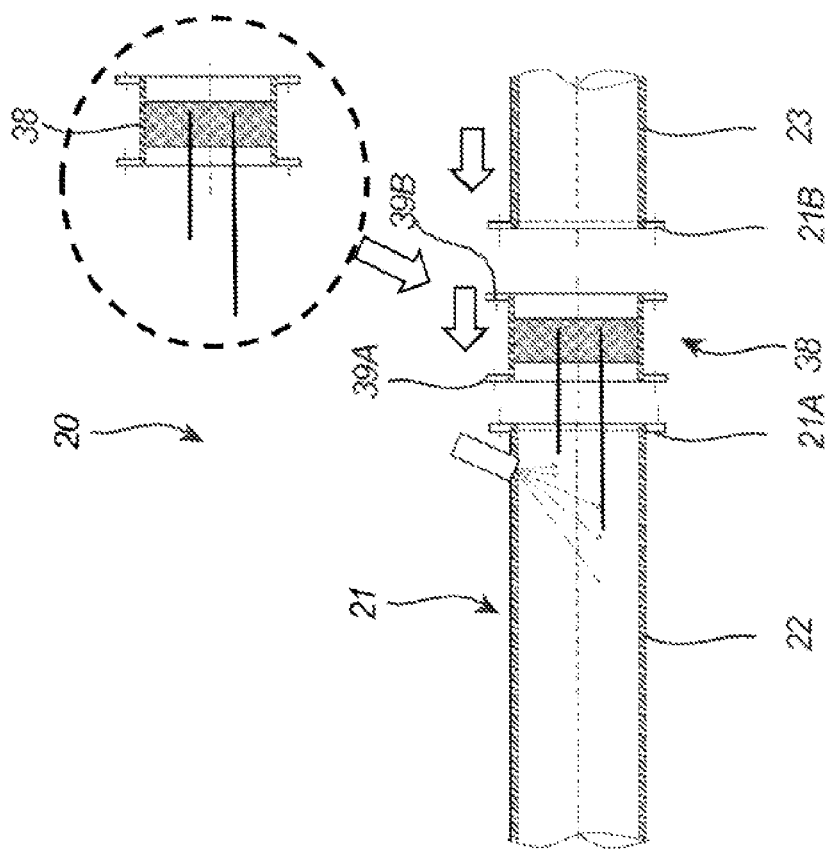
FIGS. 3A-3B shows a schematic example of how the heating arrangement is removably arranged relative the fluid channel, and is assembled/disassembled, applicable to example embodiments of the invention.
Figure 3B:
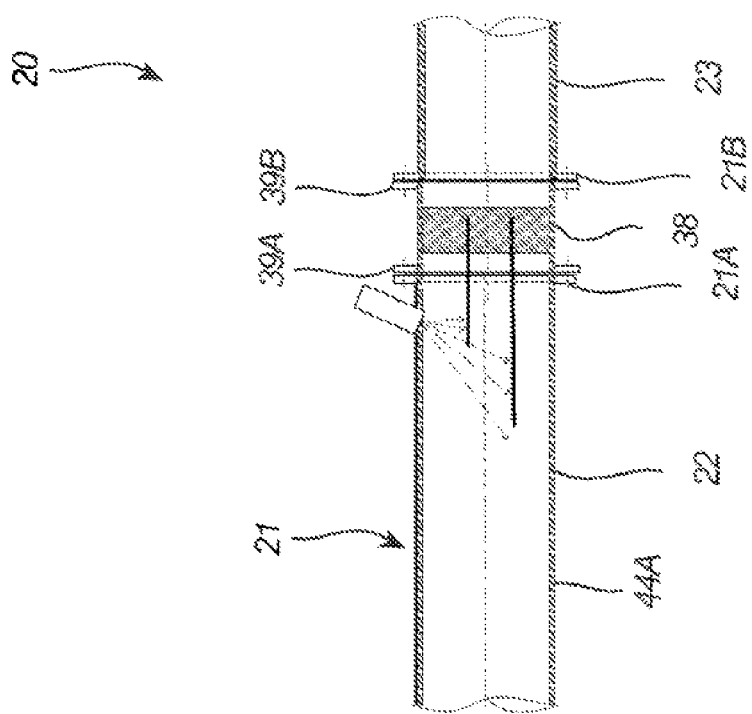

Correspondingly, the heating arrangement 38 comprises a first heating arrangement flange 39A and a second heating arrangement flange 39B arranged opposite to the first heating arrangement flange 39A. The heating arrangement 38 is removably arranged relative the fluid channel 21 by that the first channel flange 21A is removably connected to the first heating arrangement flange 39A, e.g. by screws or clamps, and by that the second channel flange 21B is removably connected to the second heating arrangement flange 39B, by e.g. screws or clamps. Thus, the heating arrangement 38 may be detached, or brought into a disassembled state, by disconnecting the first channel flange 21A from the first heating arrangement flange 39A, and disconnecting the second channel flange 21B from the second heating arrangement flange 39B. Such state is shown in FIG. 3A, in which the heating arrangement 38 is provided separately from the fluid channel 21 and in which the downstream channel portion 23 is separated from the upstream channel portion 22. Such disassembled state may be present during installation of the heating arrangement 38 to the fluid channel 21, or during maintenance of the heating arrangement 38 and/or the fluid channel. The heating arrangement 38 may thereafter be brought into an assembled state, as shown in FIG. 3B. Thus, in the assembled state, in which the heating arrangement 38 is attached to the fluid channel 21, the first channel flange 21A is circumferentially connected to the first heating arrangement flange 39A, and the second channel flange 21B is circumferentially connected to the second heating arrangement flange 39B.

However, it should be noted that the upstream channel portion 23 may be omitted, and the heating arrangement 38 being removably arranged to the downstream channel portion 22 only.

Turning back to FIG. 2, in which the heating arrangement 38 is assembled to the fluid channel 1 as previously described, the heating arrangement 38 comprises a heating channel 39 extending from the second heating arrangement flange 39B up to the first heating arrangement flange 39A. In FIG. 2, the electrical heating element 40 is arranged in the heating channel 39, such as fully arranged in the heating channel 39, That is, the electrical heating element 40 is housed within the heating arrangement and fully arranged in the heating channel 39. Thus, the first and second plates 42, 43 are arranged to extend from the heating arrangement 38, or from the heating channel 39, and into the fluid channel 21 across the first channel flange 21A.

The exhaust aftertreatment arrangement 20 is typically operated in the following manner: exhaust gases (to be cleaned) from the diesel engine enters the exhaust aftertreatment arrangement 20 via the upstream channel portion 23, and is passed through the heating arrangement 38 and the heating channel 39 whereby the exhaust gases encounter the electrical heating element 38 and is heated. As shown in FIG. 2, the electrical heating element 38 is a lattice or grating and the exhaust gases will thus be heated when flowing through the lattice or grating. It should be noted that the electrical heating element may be arranged in a different way, and e.g. comprise a heating coil or a heating foam, through which the exhaust gases will be heated by flowing across a heated surface of the heating coil or heating foam. The heated exhaust gases continue along the fluid pathway 26 into the downstream channel portion 22, and to a position in which the reductant is injected by injector 34. The injected reductant is thus partly mixed with the heated exhaust gases and the heat provided by the electrical heating element 38. However, to improve the process of evaporating the injected reductant, the injector and the evaporation member (here being the first and second plates 42, 43) are arranged such that liquid reductant is injected to come into contact with the first and second plates 42, 43. As the first and second plates 42, 43 are heated by the electrical heating element 40, sufficient heat is provided for evaporating the reductant, and possibly hydrolizing the reductant into ammonia. The ammonia and exhaust gases thereafter enter the SCR catalyst 32 for catalytic reduction of the NOx, whereafter the cleaned exhaust gases are discharged from the exhaust aftertreatment arrangement 20 or further cleaned via downstream processes.

Figure 5:
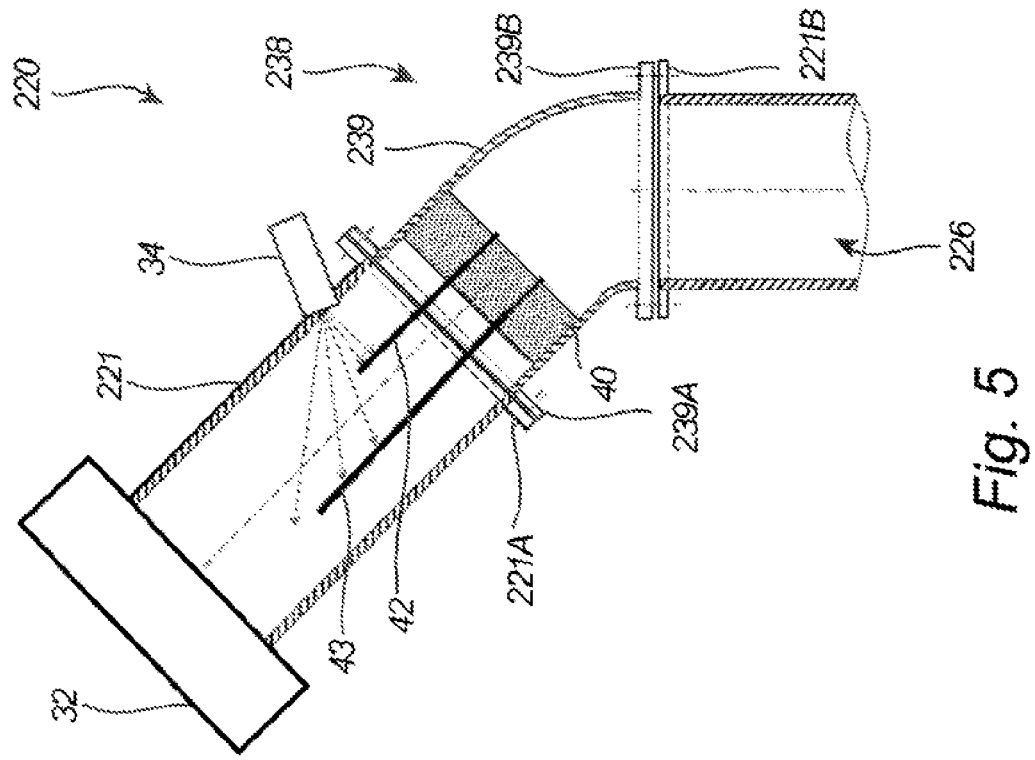
FIG. 5 is a schematic cross sectional view of an exhaust aftertreatment arrangement in accordance with an example embodiment of the invention.

Turning to FIG. 5 showing an exhaust aftertreatment arrangement 220 which at least in part corresponds to that of the exhaust aftertreatment arrangement 20 of FIG. 2, at least in that the SCR catalyst 32 and the injector 34 is identical or similar, why the same reference numerals are used and the functionalities thereof not repeated here again. Furthermore, even though the heating arrangement 238 is arranged differently to the heating arrangement 38 of FIG. 2, which will be described in detail later, the electrical heating element 40 and the first and second plates 42, 43 are identical or the same, why the same reference numerals are used and the functionalities thereof not repeated here again. Corresponding to the embodiment of FIG. 2, the exhaust aftertreatment arrangement 220 comprises a fluid channel 221 for providing a fluid pathway 226 for the exhaust gases, wherein the SCR catalyst 32 is arranged downstream the fluid channel 221. Moreover, the injector 34 and the heating arrangement 238 are arranged upstream of the SCR catalyst 32.

The heating arrangement 238 comprises a heating channel 239 in principle corresponding to the heating channel 39 of the embodiment of FIG. 2, but with the difference that the heating channel 239 of FIG. 5 comprise a channel bend. Stated differently, the heating channel 239 is bent or curved. Hereby, exhaust gases flowing through the heating channel 239 may be subject to increased mixing, and the heating of the exhaust gases may be improved. It should be understood that the heating arrangement 238 of FIG. 5 typically is removably arranged relative the fluid channel 221 by means of a first and second channel flanges 221A, 221B and corresponding first and second heating arrangement flanges 239A, 239B, as been previously described with the embodiment of FIGS. 2, 3A-3B.

Figure 4:
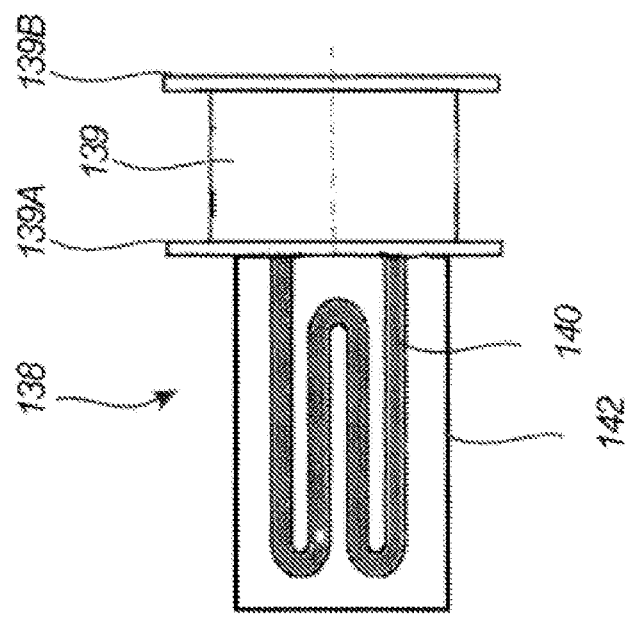
FIG. 4 is a schematic cross sectional view of a heating arrangement in accordance with an example embodiment of the invention.

In FIG. 4, an alternative heating arrangement 138 is shown. The heating arrangement 138 may e.g. be arranged in the fluid channel 21 of the embodiment of FIG. 2, and functions in principle in the same way as the embodiment of FIG. 2. In the embodiment of FIG. 4, the heating arrangement 138 comprises a heating channel 139 and corresponding first and second heating arrangement flanges 139A, 139B. The heating arrangement 138 comprises an electrical heating element 140 and an evaporation member 142 in the form of a plate 142. The electrical heating element 140 in FIG. 4 is arranged to extend from the heating channel 139 and out from the first heating arrangement flange 139A. The heating arrangement 138 of FIG. 4 is viewed from underneath, thus the reductant impacting surface of the plate 142, which is arranged to face the injector 34, is arranged facing away from the viewer. In other words, the electrical heating element 140 is arranged on a surface opposite the reductant impacting surface of plate 142, and thus, any injected liquid reductant will come into contact with the plate 142 but not the electrical heating element 140.

Figure 6:
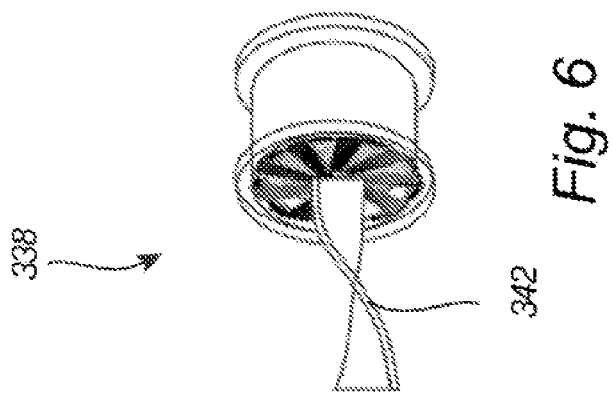
FIG. 6 is yet another schematic cross sectional view of a heating arrangement in accordance with an example embodiment of the invention.

Yet another embodiment of a heating arrangement 338 is shown in FIG. 6. The heating arrangement 338 may e.g. be arranged in the fluid channel 21 of the embodiment of FIG. 2, and functions in principle in the same way as the embodiment of FIG. 2. In the embodiment of FIG. 6, the heating arrangement 338 comprises an electrical heating element (not shown) and an evaporation member 342 in the form of a curved, or angled, plate 342, extending out from a heating channel of the heating arrangement. The curved plate 342 is configured to induce a swirling motion of the exhaust gases. Hereby, exhaust gases flowing across the curved plate 342 may be subject to increased mixing, and the heating of the exhaust gases may be improved.

As shown in the embodiments of e.g. FIGS. 2-5, the heating arrangement 38, 138, 238 is arranged such that, in use, the injected liquid reductant is prevented from being brought into contact with the electrical heating element 40, 140. For example, the electrical heating element 40, as shown in FIGS. 2 and 5, is arranged upstream of the injector 34 and fully inside the heating channel 39, 239, resulting in a satisfactory distance between the injected liquid reductant and the electrical heating element 40. According to another example, the electrical heating element 140 is shielded, or protected, by the evaporation member 142 being in the form of a plate 142.

Figure 7:
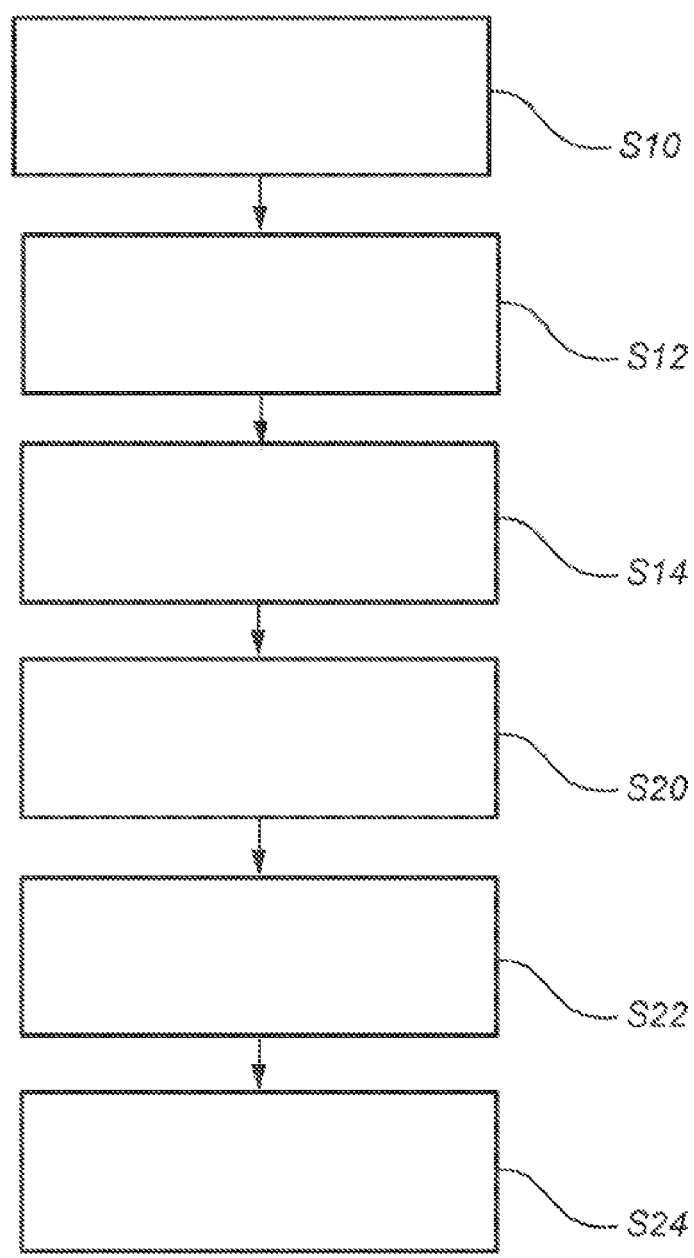
FIG. 7 is a flowchart illustrating the steps of a method in accordance with one example embodiment of the invention.

A method for assembling and/or disassembling a heating arrangement relative a fluid channel of an exhaust aftertreatment arrangement for converting NOx emissions, will now be generally described with reference to FIG. 7. Thus, the exhaust aftertreatment arrangement may be that of FIGS. 2 and 5, and the heating arrangement may be that of FIGS. 2, 4-6. Thus, the exhaust aftertreatment arrangement comprises a fluid channel for providing a fluid pathway for the exhaust gases, a selective catalyst reduction, SCR, catalyst, arranged in or downstream the fluid channel, and an injector configured to inject a liquid reductant for providing ammonia to the SCR catalyst, the injector being arranged upstream of the SCR catalyst. The heating arrangement typically comprises an electrical heating element and at least one evaporation member configured to be heated by the heating element, the heating arrangement being removably connectable to the fluid channel.

In a first step S10, the heating arrangement is assembled to the fluid channel such that the heating arrangement is arranged upstream of the SCR catalyst and the evaporation member is arranged in the fluid channel such that at least a portion of the injected liquid reductant comes into contact with the evaporation member when injected.

As been described with reference to the embodiment of FIG. 2, the fluid channel may comprise a first channel flange arranged upstream of the injector, and the heating arrangement may comprise a first heating arrangement flange. Thus, the first step S10 of assembling may optionally comprise a first sub-step S12 of circumferentially connecting the first channel flange to the first heating arrangement flange. Moreover, as has also been described earlier, the fluid channel may further comprise a second channel flange arranged upstream of the first channel flange, and the heating arrangement may further comprise a second heating arrangement flange arranged opposite to the first heating arrangement flange. Thus, the first step of assembling S10 may comprise the first sub-step S12 of circumferentially connecting the first channel flange to the first heating arrangement flange and a second sub-step S14 of circumferentially connecting the second channel flange to the second heating arrangement flange.

In a second step S20, which may be performed subsequent to the first step S10, and any of the optional sub-steps S12, S14, or be performed instead of, or prior to the first step S10, and any of the optional sub-steps S12, S14, the heating arrangement is disassembled from the fluid channel. Correspondingly to the first and second sub-steps S12, S14, the second step S20 of disassembling may comprise a third sub-step S22 of disconnecting the first channel flange from the first heating arrangement flange and fourth sub-step S24 of disconnecting the second channel flange from the second heating arrangement flange.

It is to be understood that the present invention is not limited to the embodiments described above and illustrated in the drawings; rather, the skilled person will recognize that many changes and modifications may be made within the scope of the appended claims. For example, the electrical heating element may be powered via an electrical connection which is integrated in a housing of the heating arrangement. For example, the operating power of the electrical heating element may be between 300 W and 15000 W. Moreover, the exhaust aftertreatment arrangement may be used for converting NOx emission from the exhausts of other engines than diesel engines. For example, the present exhaust aftertreatment arrangement may be used to convert NOx emissions from the exhaust of internal combustion engines based on CNG (Compressed Natural Gas), LPG (Liquefied Pressurized Gas), DME (DiMethylEther), and/or H2 (Hydrogen).

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An exhaust aftertreatment arrangement for converting NOx emissions, the exhaust aftertreatment arrangement comprising: a fluid channel for providing a fluid pathway for the exhaust gases, a selective catalyst reduction (SCR) catalyst, arranged in or downstream the fluid channel, an injector configured to inject a liquid reductant for providing ammonia to the SCR catalyst, the injector being arranged upstream of the SCR catalyst, a heating arrangement for heating the injected reductant, the heating arrangement being arranged upstream of the SCR catalyst and comprising an electrical heating element and an evaporation member configured to be heated by the heating element, wherein the heating arrangement is removably arranged relative the fluid channel such that, in an assembled state, the evaporation member is arranged in the fluid channel such that at least a portion of the injected liquid reductant comes into contact with the evaporation member when injected, and wherein the electrical heating element of the heating arrangement is, in the assembled state, arranged upstream of the injector, and wherein the fluid channel comprises a first channel flange arranged upstream of the injector, and the heating arrangement comprises a first heating arrangement flange, such that, in the assembled state, the first channel flange is circumferentially connected to the first heating arrangement flange, and wherein the heating arrangement is removably arranged relative to the fluid channel at least by the first channel flange being removably connected to the first heating arrangement flange.

2. The exhaust aftertreatment arrangement according to claim 1, wherein the fluid channel further comprises a second channel flange arranged upstream of the first channel flange, and wherein the heating arrangement further comprises a second heating arrangement flange arranged opposite to the first heating arrangement flange, such that, in the assembled state, the second channel flange is circumferentially connected to the second heating arrangement flange, and wherein the heating arrangement is removably arranged relative the fluid channel by that the first channel flange is removably connected to the first heating arrangement flange and by that the second channel flange is removably connected to the second heating arrangement flange.

3. The exhaust aftertreatment arrangement according to claim 1, wherein the evaporation member is, in the assembled state, arranged to extend from the heating arrangement into the fluid channel across the first channel flange.

4. The exhaust aftertreatment arrangement according to claim 1, wherein the evaporation member is configured to induce a swirling motion of the exhaust gases.

5. The exhaust aftertreatment arrangement according to claim 1, wherein the heating arrangement is arranged such that, in use, the injected liquid reductant is prevented from being brought into contact with the electrical heating element.

6. The exhaust aftertreatment arrangement according to claim 1, wherein the heating arrangement comprises a heating channel extending up to the first heating arrangement flange, and wherein the electrical heating element is arranged in the heating channel, or wherein the electrical heating element is arranged to extend from the heating channel or out from the first heating arrangement flange.

7. The exhaust aftertreatment arrangement according to claim 6, wherein the heating channel comprises a channel bend.

8. The exhaust aftertreatment arrangement according to claim 1, wherein the evaporation member comprises a plate having a reductant impacting surface arranged to face the injector.

9. The exhaust aftertreatment arrangement according to claim 8, wherein the plate is a first plate having a first longitudinal extension, and the evaporation member further comprises a second plate having a second longitudinal extension different to the first longitudinal extension.

10. A vehicle comprising an exhaust aftertreatment arrangement according to claim 1.

11. A heating arrangement for an exhaust aftertreatment arrangement for converting NOx emissions, the exhaust aftertreatment arrangement comprising a fluid channel for providing a fluid pathway for the exhaust gases, a selective catalyst reduction (SCR) catalyst, arranged in or downstream the fluid channel, and an injector configured to inject a liquid reductant for providing ammonia to the SCR catalyst, the injector being arranged upstream of the SCR catalyst, wherein the heating arrangement comprises an electrical heating element and an evaporation member configured to be heated by the heating element, wherein the heating arrangement is removably connectable to the fluid channel such that, in the assembled state, the evaporation member is arranged in the fluid channel such that at least a portion of the injected liquid reductant comes into contact with the evaporation member when it is injected, and wherein the electrical heating element of the heating arrangement is, in the assembled state, arranged upstream of the injector, the heating arrangement further comprising a first heating arrangement flange and a second heating arrangement flange arranged opposite to the first heating arrangement flange, wherein the first heating arrangement flange is circumferentially connectable to a first channel flange of the fluid channel, and the second heating arrangement flange is circumferentially connectable to a second channel flange of the fluid channel.

12. A method for assembling and/or disassembling a heating arrangement relative a fluid channel of an exhaust aftertreatment arrangement for converting NOx emissions, the exhaust aftertreatment arrangement comprising a fluid channel for providing a fluid pathway for the exhaust gases, a selective catalyst reduction (SCR) catalyst, arranged in or downstream the fluid channel, and an injector configured to inject a liquid reductant for providing ammonia to the SCR catalyst, the injector being arranged upstream of the SCR catalyst, wherein the heating arrangement comprises an electrical heating element and an evaporation member configured to be heated by the heating element, the heating arrangement being removably connectable to the fluid channel, the method comprising: assembling the heating arrangement relative the fluid channel such that the heating arrangement is arranged upstream of the SCR catalyst and upstream of the injector and the evaporation member is arranged in the fluid channel such that at least a portion of the injected liquid reductant comes into contact with the evaporation member when injected, and/or disassembling the heating arrangement from the fluid channel, wherein the fluid channel comprises a first channel flange arranged upstream of the injector, and the heating arrangement comprises a first heating arrangement flange, wherein the step of assembling the heating arrangement relative to the fluid channel comprises circumferentially connecting the first channel flange to the first heating arrangement flange, and/or wherein the step of disassembling comprises disconnecting the first channel flange from the first heating arrangement flange.

13. An exhaust aftertreatment arrangement for converting NOx emissions, the exhaust aftertreatment arrangement comprising: a fluid channel for providing a fluid pathway for the exhaust gases, a selective catalyst reduction (SCR) catalyst, arranged in or downstream the fluid channel, an injector configured to inject a liquid reductant for providing ammonia to the SCR catalyst, the injector being arranged upstream of the SCR catalyst, a heating arrangement for heating the injected reductant, the heating arrangement being arranged upstream of the SCR catalyst and comprising an electrical heating element and an evaporation member configured to be heated by the heating element, wherein the heating arrangement is removably arranged relative the fluid channel such that, in an assembled state, the evaporation member is arranged in the fluid channel such that at least a portion of the injected liquid reductant comes into contact with the evaporation member when injected, and wherein the electrical heating element of the heating arrangement is, in the assembled state, arranged upstream of the injector, wherein the evaporation member comprises a plate having a reductant impacting surface arranged to face the injector, wherein the plate is a first plate having a first longitudinal extension, and the evaporation member further comprises a second plate having a second longitudinal extension different to the first longitudinal extension.

* * * * *